United States Patent
Maguire-Boyle et al.

(10) Patent No.: US 11,255,768 B2
(45) Date of Patent: Feb. 22, 2022

(54) IN SITU EVALUATION OF FILTER PARAMETERS WITH OPTICOANALYTICAL DEVICES

(71) Applicant: HALLIBURTON ENERGY SERVICES, INC., Houston, TX (US)

(72) Inventors: Samuel James Maguire-Boyle, Houston, TX (US); Robert P Freese, Houston, TX (US)

(73) Assignee: Halliburton Energy Services, Inc., Houston, TX (US)

(*) Notice: Subject to any disclaimer, the term of this patent is extended or adjusted under 35 U.S.C. 154(b) by 312 days.

(21) Appl. No.: 15/302,117

(22) PCT Filed: Jun. 25, 2014

(86) PCT No.: PCT/US2014/043997
§ 371 (c)(1),
(2) Date: Oct. 5, 2016

(87) PCT Pub. No.: WO2015/199669
PCT Pub. Date: Dec. 30, 2015

(65) Prior Publication Data
US 2017/0138832 A1 May 18, 2017

(51) Int. Cl.
*H01J 5/16* (2006.01)
*G01N 15/08* (2006.01)
(Continued)

(52) U.S. Cl.
CPC .......... *G01N 15/08* (2013.01); *B01D 35/143* (2013.01); *B01D 46/0086* (2013.01);
(Continued)

(58) Field of Classification Search
CPC .... G01N 15/08; B01D 46/0086; B01D 61/10; B01D 61/20; B01D 65/10; B01D 35/143
(Continued)

(56) References Cited

U.S. PATENT DOCUMENTS 4,187,000 A * 2/1980 Constant ................. G06E 3/001
359/107
4,580,059 A * 4/1986 Wolfbeis .............. G01N 21/643
250/458.1
(Continued)

FOREIGN PATENT DOCUMENTS

CA 2479208 10/2003
EP 1539994 9/2009
(Continued)

OTHER PUBLICATIONS

"International Application Serial No. PCT/US2014/043997, International Search Report dated Mar. 31, 2015", 3 pgs.
(Continued)

*Primary Examiner* — Georgia Y Epps
*Assistant Examiner* — Kevin Wyatt
(74) *Attorney, Agent, or Firm* — Chamberlain Hrdlicka (57) ABSTRACT

A system can include a filter assembly with a filter and a substance in the filter assembly, and at least one optical computing device having an integrated computational element which receives electromagnetic radiation from the substance. A method can include receiving electromagnetic radiation from a substance in a filter assembly, the electromagnetic radiation from the substance being received by at least one optical computing device having an integrated computational element, and the receiving being performed while a filter is positioned in the filter assembly. A detector may receive electromagnetic radiation from the integrated computational element and produce an output correlated to a characteristic of the substance. A mitigation technique may be selected, based on the detector output.

23 Claims, 6 Drawing Sheets

(51) Int. Cl.
*B01D 46/00* (2022.01)
*B01D 65/10* (2006.01)
*B01D 61/12* (2006.01)
*B01D 65/02* (2006.01)
*B01D 61/22* (2006.01)
*B01D 35/143* (2006.01)
*B01D 61/10* (2006.01)
*B01D 61/20* (2006.01)

(52) U.S. Cl.
CPC ............ *B01D 61/10* (2013.01); *B01D 61/12* (2013.01); *B01D 61/20* (2013.01); *B01D 61/22* (2013.01); *B01D 65/02* (2013.01); *B01D 65/10* (2013.01); *B01D 2273/18* (2013.01); *G01N 2015/084* (2013.01); *G01N 2015/0846* (2013.01)

(58) Field of Classification Search
USPC .......................................................... 250/226
See application file for complete search history.

(56) References Cited

U.S. PATENT DOCUMENTS

| | | | |
|---|---|---|---|
| 4,948,959 A * | 8/1990 | Houk | G06E 1/065 250/578.1 |
| 5,239,861 A * | 8/1993 | Fujita | B01D 29/05 73/61.73 |
| 6,198,531 B1 | 3/2001 | Myrick et al. | |
| 6,529,276 B1 | 3/2003 | Myrick | |
| 7,123,844 B2 | 10/2006 | Myrick | |
| 7,449,146 B2 * | 11/2008 | Rakow | G01N 21/45 422/417 |
| 7,834,999 B2 | 11/2010 | Myrick et al. | |
| 7,911,605 B2 | 3/2011 | Myrick et al. | |
| 7,920,258 B2 | 4/2011 | Myrick et al. | |
| 8,049,881 B2 | 11/2011 | Myrick et al. | |
| 8,208,147 B2 | 6/2012 | Myrick et al. | |
| 8,310,235 B1 | 11/2012 | Gerald, II et al. | |
| 8,358,418 B2 | 1/2013 | Myrick | |
| 8,493,221 B2 | 7/2013 | Cash et al. | |
| 8,575,541 B1 | 11/2013 | Jamison et al. | |
| 8,610,440 B2 | 12/2013 | Coster et al. | |
| 8,879,053 B2 * | 11/2014 | Freese | G01K 13/00 356/73 |
| 2006/0141466 A1 * | 6/2006 | Pinet | G01N 21/23 435/6.11 |
| 2009/0134329 A1 * | 5/2009 | Kasai | G01N 21/3581 250/338.1 |
| 2009/0182693 A1 | 7/2009 | Fulton et al. | |
| 2012/0012393 A1 * | 1/2012 | Kumar | E21B 25/00 175/58 |
| 2012/0150451 A1 * | 6/2012 | Skinner | G01N 33/2823 702/24 |
| 2013/0031971 A1 | 2/2013 | Freese et al. | |
| 2013/0031972 A1 | 2/2013 | Freese et al. | |
| 2013/0032333 A1 | 2/2013 | Freese et al. | |
| 2013/0032334 A1 | 2/2013 | Freese et al. | |
| 2013/0032344 A1 | 2/2013 | Freese et al. | |
| 2013/0032545 A1 | 2/2013 | Freese et al. | |
| 2013/0032736 A1 | 2/2013 | Tunheim et al. | |
| 2013/0068673 A1 * | 3/2013 | Maggiore | B01D 35/30 210/95 |
| 2013/0286399 A1 | 10/2013 | Freese et al. | |

FOREIGN PATENT DOCUMENTS

| | | |
|---|---|---|
| WO | 2007087578 | 8/2007 |
| WO | WO-2007085980 A1 | 8/2007 |
| WO | WO-2009148817 A2 | 12/2009 |
| WO | WO-2012083390 A2 | 6/2012 |
| WO | WO-2015199669 A1 | 12/2015 |

OTHER PUBLICATIONS

"International Application Serial No. PCT/US2014/043997, Written Opinion dated Mar. 31, 2015", 7 pgs.

Dobrowolski, J.A. and Kemp, R.A.; "Refinement of optical multilayer systems with different optimization procedures", Applied Optics, vol. 29, No. 19, Jul. 1, 1990.

Sullivan, Brian T. and Dobrowolski, J.A.; "Implementation of a numerical needle method forthin-film design", Applied Optics, vol. 35, No. 28, Oct. 1, 1996.

* cited by examiner

IN SITU EVALUATION OF FILTER PARAMETERS WITH OPTICOANALYTICAL DEVICES

RELATED APPLICATIONS

This application is a U.S. National Stage Filing under 35 U.S.C. 371 of International Patent Application Serial No. PCT/US2014/043997, filed Jun. 25, 2014, and published on Dec. 30, 2015 as WO 2015199669 A1, the benefit of priority of which is claimed hereby and which is incorporated herein by reference in its entirety.

TECHNICAL FIELD

This disclosure relates generally to equipment utilized and operations performed in conjunction with filters and, in one example described below, more particularly provides for in situ evaluation of filter parameters with opticoanalytical devices.

BACKGROUND

When a filter becomes fouled with a fouling substance, there are various cleaning techniques, substances (such as chemicals and/or abrasives), etc. that can possibly be used to remove the fouling substance and return the filter to its pre-fouled performance. However, if the fouling substance is not known, or if the fouling substance changes over time, an appropriate cleaning technique or cleaning substance cannot be determined. In addition, if a substantial amount of time is required to disassemble a filter assembly and analyze the fouling substance, this time takes away from productive use of the filter.

Thus, it will be readily appreciated that improvements are continually needed in the art of evaluating filter parameters. Such improvements may be used for identifying a type and extent of a fouling substance, and/or for other purposes.

DETAILED DESCRIPTION

The example systems and methods described herein employ various configurations of optical computing devices, also commonly referred to as "opticoanalytical devices," for the real-time or near real-time monitoring of filter parameters. In operation, the systems and methods disclosed herein may be useful and otherwise advantageous in evaluating fouling substances in and/or on filters. For example, the optical computing devices described in more detail below can advantageously provide real-time or near real-time in situ monitoring of filter parameters, without requiring time-consuming or destructive analyses that take place in a laboratory, or that require a filter to be taken off-line.

In some examples, these devices can be configured to specifically detect and/or measure a particular component or characteristic of interest of a filter, such as a presence and extent of a known fouling substance, thereby allowing qualitative and/or quantitative analyses of the filter to occur without having to undertake a time-consuming sample processing procedure. With real-time or near real-time analyses on hand, the example systems and methods described herein may be able to provide some measure of proactive or responsive control over filter operation and cleaning processes, enable the collection and archival of filter information in conjunction with operational information to optimize subsequent operations, and/or enhance a capability for remote job execution.

Those skilled in the art will readily appreciate that the systems and methods disclosed herein may be suitable for use in the oil and gas industry since the described optical computing devices provide a relatively low cost, rugged, and accurate means for monitoring filter operation in order to facilitate the efficient management of exploration, drilling, completion, stimulation, production, conformance or other oilfield operations. It will be appreciated, however, that the various disclosed systems and methods are equally applicable to other technology fields including, but not limited to, the food and drug industry, industrial applications, mining industries, nuclear power generation (e.g., to monitor membranes used to separate isotopes) or any field where it may be advantageous to determine in real-time or near real-time the concentration or a characteristic of a specific substance.

In one example, the described systems and methods may be employed to monitor accumulation and mitigation of fouling substances in a filter, such as a membrane filter. In addition, the filter integrity can be monitored using the described systems and methods.

In other examples, the systems and methods may be employed in the military or security fields, such as in submarines or other water craft. In yet other examples, the present systems and methods may prove useful in the trucking and auto industries, or in any other industry in which filters are used.

The optical computing devices suitable for use in the systems and methods can be deployed at any of various locations to monitor filter parameters. For example, the devices can be positioned within a filter assembly, such as, within an outer housing of a filter assembly. As another example, the devices can be positioned within a filter itself. As yet another example, the devices can be positioned external to a filter assembly, but still receive and evaluate electromagnetic radiation from a filter in the filter assembly. Thus, the scope of this disclosure is not limited to any particular position of an optical computing device.

As used herein, the term "fluid" refers to any substance that is capable of flowing, including particulate solids, liquids, gases, slurries, emulsions, powders, muds, ions and solutions of ions (for example, brines), foams, gas clathrates, glasses, combinations thereof, and the like. In some embodiments, the fluid can be an aqueous fluid, including water or the like. In some embodiments, the fluid can be a non-aqueous fluid, including organic compounds, more specifically, hydrocarbons, oil, a refined component of oil, petrochemical products, and the like. In some embodiments, the fluid can be a treatment fluid or a formation fluid. Fluids can include various flowable mixtures of solids, liquids and/or gases. Illustrative gases that can be considered fluids according to the present embodiments include, for example, air, nitrogen, carbon dioxide, hydrogen sulfide, argon, helium, methane, ethane, butane, and other hydrocarbon gases, combinations thereof and/or the like.

As used herein, the term "characteristic" refers to an optical, chemical, mechanical or physical property of a substance. A characteristic of a substance may include a quantitative value of one or more chemical components therein. Such chemical components may be referred to herein as "analytes." Illustrative characteristics of a substance that can be monitored with the optical computing devices disclosed herein can include, for example, chemical composition (e.g., identity and concentration in total or of individual components), and presence of bacteria, carbonates, sulfonates, iron scaling, asphaltenes, waxes, long chain hydrocarbons, combinations thereof, and the like.

As used herein, the term "flow path" refers to a route through which a fluid is capable of being transported between two points. In some cases, the flow path need not be continuous or otherwise contiguous between the two points. Example flow paths include, but are not limited to, a filter housing, a flow line, a pipeline, a hose, a fluid separator, a process facility, a storage vessel, combinations thereof, or the like.

In some examples, the flow path is not necessarily contained within any rigid structure, but refers to the path fluid takes between two points, such as where a fluid flows from one location to another without being contained, per se. It should be noted that the term flow path does not necessarily imply that a fluid is flowing therein, rather that a fluid is capable of being transported or otherwise flowable therethrough.

As used herein, the term "substance," or variations thereof, refers to at least a portion of a material of interest to be evaluated using the optical computing devices described herein. In some embodiments, the substance is the characteristic of interest, as defined above, and may include any integral component of a filter. In other embodiments, the substance may be a material of interest in and/or on a filter.

As used herein, the term "electromagnetic radiation" refers to radio waves, microwave radiation, infrared and near-infrared radiation (including black body radiation), visible light, ultraviolet light, X-ray radiation and gamma ray radiation.

As used herein, the term "optical computing device" refers to an optical device that is configured to receive an input of electromagnetic radiation from a substance, and produce an output of electromagnetic radiation from a processing element arranged within the optical computing device. The processing element may be, for example, an integrated computational element (ICE) used in the optical computing device.

As discussed in greater detail below, electromagnetic radiation optically interacts with the material of interest (e.g., a filter or the substances on a filter) and is sent through a processing element, so as to be readable by a detector, such that an output of the detector can be correlated to at least one characteristic of interest being measured or monitored of the filter. The output of electromagnetic radiation from the material of interest can be reflected electromagnetic radiation, transmitted electromagnetic radiation, re-radiated radiation (e.g., fluorescent or phosphorescent radiation) and/or dispersed or scattered electromagnetic radiation.

Whether reflected, transmitted or re-radiated electromagnetic radiation is analyzed by the detector may be dictated by the structural parameters of the optical computing device, as well as other considerations known to those skilled in the art. In addition, emission and/or scattering of the substance (for example, via fluorescence, luminescence, Raman scattering, and/or Raleigh scattering) can also be monitored by the optical computing devices.

As used herein, the term "optically interact" or variations thereof refers to the reflection, transmission, scattering, diffraction or absorption of electromagnetic radiation either on, through or from the substance or one or more processing elements (i.e., integrated computational elements). Accordingly, optically interacted light refers to electromagnetic radiation that has been reflected, transmitted, scattered, diffracted, or absorbed by, emitted, or re-radiated, for example, using the integrated computational elements, but may also apply to interaction with a fluid or a substance in the fluid.

The example systems and methods described herein will include one or more optical computing devices strategically arranged relative to a filter, in order to monitor one or more substances or characteristics of interest in and/or on the filter. Each optical computing device may include an electromagnetic radiation source, at least one processing element (e.g., one or more integrated computational elements), and at least one detector arranged to receive optically interacted light from the processing element(s).

The detector may comprise an item of optical equipment, or in some examples, the detector could comprise a human eye. Thus, a visual inspection of the optically interacted light from the processing element(s) could be used to detect characteristics of the substance.

As described below, however, in at least one example, the electromagnetic radiation source may be omitted and instead the electromagnetic radiation may be derived from the substance itself. In some examples, the optical computing devices may be specifically configured for detecting, analyzing, and quantitatively measuring a particular characteristic or analyte of interest of the substance in or on the filter. In other examples, the optical computing devices may be general purpose optical devices, with post-acquisition processing (e.g., through computer means) being used to specifically detect the characteristic of the substance.

In some embodiments, suitable structural components for the example optical computing devices are described in one or more of commonly owned U.S. Pat. Nos. 6,198,531, 6,529,276, 7,123,844, 7,834,999, 7,911,605, 7,920,258 and 8,049,881, 8,208,147, 8,358,418 and US publication no. 2013/0286399. As will be appreciated, variations of the structural components of the optical computing devices described in the above-referenced patents and published application may be appropriate, without departing from the scope of this disclosure, and therefore, should not be considered limiting to the various examples disclosed herein.

The optical computing devices described in the foregoing patents and published application combine power, precision and accuracy associated with laboratory spectrometers, while being extremely rugged and suitable for field use. Furthermore, the optical computing devices can perform calculations (analyses) in real-time or near real-time without the need for time-consuming sample retrieval and processing.

In this regard, the optical computing devices can be specifically configured to detect and analyze particular characteristics and/or analytes of interest of a substance in or on a filter. As a result, interfering signals are discriminated from those of interest in the substance by appropriate configuration of the optical computing devices, such that the optical computing devices provide a rapid response regarding the characteristics of the substance as based on the detected output.

In some examples, the detected output can be converted into a voltage that is distinctive of the magnitude of the substance characteristic being monitored. Thus, the optical computing devices are particularly well suited for oilfield and downhole use, but may equally be applied to other industries or technologies where accurate monitoring of filters is desirable.

The optical computing devices can be configured to detect not only the composition and concentrations of a substance in or on a filter, but they also can be configured to determine physical properties and other characteristics of the substance as well, based on their analysis of the electromagnetic radiation received from the substance. For example, the optical computing devices can be configured to determine the concentration of an analyte and correlate the determined concentration to a characteristic of a substance by using suitable processing means.

As will be appreciated, the optical computing devices may be configured to detect as many characteristics or analytes as desired for a given substance. All that is required to accomplish the monitoring of multiple characteristics or analytes is the incorporation of suitable processing and detection means within the optical computing device for each characteristic or analyte.

In some examples, the properties of the substance can be a combination of the properties of the analytes therein (e.g., a linear, non-linear, logarithmic, and/or exponential combination). Accordingly, the more characteristics and analytes that are detected and analyzed using the optical computing devices, the more accurately the properties or concentration of the given substance will be determined.

The optical computing devices described herein utilize electromagnetic radiation to perform calculations, as opposed to hardwired circuits of conventional electronic processors. When electromagnetic radiation interacts with a substance, unique physical and chemical information about the substance may be encoded in the electromagnetic radiation that is reflected from, transmitted through, or radiated from the substance. This information is often referred to as the spectral "fingerprint" of the substance.

The optical computing devices described herein are capable of extracting the information of the spectral fingerprint of multiple characteristics or analytes within a substance and converting that information into a detectable output regarding the overall properties of the substance. That is, through suitable configurations of the optical computing devices, electromagnetic radiation associated with characteristics or analytes of interest in a substance can be separated from electromagnetic radiation associated with all other components of the substance in order to estimate the properties of the substance in real-time or near real-time.

As briefly mentioned above, the processing elements used in the example optical computing devices described herein may be characterized as integrated computational elements (ICE). Each ICE is capable of distinguishing electromagnetic radiation related to the characteristic or analyte of interest from electromagnetic radiation related to other components of a substance.

Figure 1:
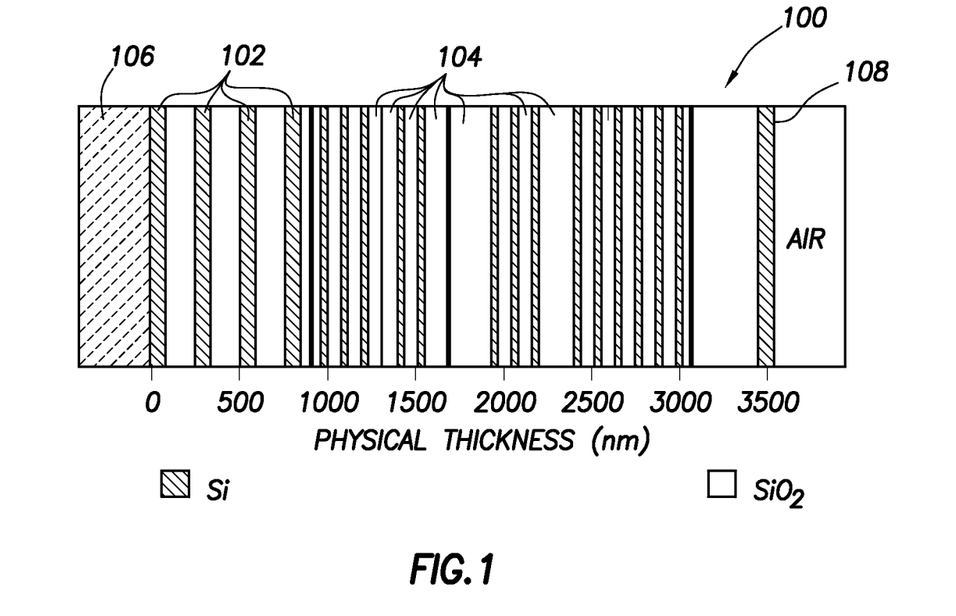
FIG. 1 is a representative cross-sectional view of an example of an integrated computational element that may be used in systems and methods incorporating principles of this disclosure.

Referring to FIG. 1, illustrated is an example ICE 100 suitable for use in the optical computing devices in the systems and methods described herein. As illustrated, the ICE 100 may include a plurality of alternating layers 102 and 104, such as silicon (Si) and $SiO_2$ (quartz), respectively.

In general, these layers 102, 104 consist of materials whose index of refraction is relatively high and low, respectively. Other examples might include niobia and niobium, germanium and germania, MgF, SiO, and other high and low index materials known in the art. Those skilled in the art will readily recognize that the materials that make up each layer 102, 104 may vary, depending on the application, cost of materials, and/or applicability of the material to the monitored substance.

The layers 102, 104 may be strategically deposited on an optical substrate 106. In some embodiments, the optical substrate 106 is BK-7 optical glass. In other embodiments, the optical substrate 106 may be another type of optical substrate, such as quartz, sapphire, silicon, germanium, zinc selenide, zinc sulfide, or various plastics such as polycarbonate, polymethylmethacrylate (PMMA), polyvinylchloride (PVC), diamond, ceramics, combinations thereof, and the like.

At an opposite end (e.g., opposite the optical substrate 106 in FIG. 1), the ICE 100 may include a layer 108 that is generally exposed to the environment of the filter in situ, so that electromagnetic radiation from the substance in or on the filter can be received by the ICE. In other examples, the layer 108 may not be exposed to the environment of the filter in situ, but can still receive the electromagnetic radiation from the substance in or on the filter in situ (such as, via an optical fiber or other electromagnetic waveguide).

The number of layers 102, 104 and the thickness of each layer 102, 104 are determined from the spectral attributes acquired from a spectroscopic analysis of a characteristic of the substance, for example, using a conventional spectroscopic instrument. The spectrum of interest of a given characteristic of a substance typically includes any number of different wavelengths.

It should be understood that the example ICE 100 in FIG. 1 does not in fact represent any particular characteristic of a given substance, but is provided for purposes of illustration only. Consequently, the number of layers 102, 104 and their relative thicknesses, as shown in FIG. 1, bear no correlation to any particular characteristic of a given substance. Nor are the layers 102, 104 and their relative thicknesses necessarily drawn to scale, and therefore should not be considered limiting of the present disclosure.

In some embodiments, the material of each layer 102, 104 can be doped, or two or more materials can be combined, in a manner to achieve a desired optical characteristic. In addition to solids, the example ICE 100 may also contain liquids and/or gases, optionally in combination with solids, in order to produce a desired optical characteristic. In the case of gases and liquids, the ICE 100 can contain a corresponding vessel (not shown), which houses the gases or liquids. Example variations of the ICE 100 may also include holographic optical elements, gratings, piezoelectric, light pipe, digital light pipe (DLP), and/or acousto-optic elements, for example, that can create transmission, reflection, and/or absorptive properties of interest.

The multiple layers 102, 104 exhibit different refractive indices. By properly selecting the materials of the layers 102, 104 and their relative thickness and spacing, the ICE 100 may be configured to selectively pass/reflect/refract predetermined fractions of electromagnetic radiation at different wavelengths. Each wavelength is given a predetermined weighting or loading factor.

The thickness and spacing of the layers 102, 104 may be determined using a variety of approximation methods from a spectrograph of the characteristic or analyte of interest. These methods may include inverse Fourier transform (IFT) of the optical transmission spectrum and structuring the ICE 100 as the physical representation of the IFT. Such approximations convert the IFT into a structure based on known materials with constant refractive indices. Further information regarding the structures and design of example integrated computational elements (also referred to as multivariate optical elements) is provided in Applied Optics, Vol. 35, pp. 5484-5492 (1996) and Vol. 29, pp. 2876-2893 (1990).

The weightings that the layers 102, 104 of the ICE 100 apply at each wavelength are set to regression weightings described with respect to a known equation, or data, or spectral signature. Briefly, the ICE 100 may be configured to perform a dot product of the electromagnetic wave input to the ICE 100 and a desired loaded regression vector represented by each layer 102, 104 for each wavelength.

As a result, an output light intensity of the ICE 100 is related to the characteristic or analyte of interest. Further details regarding how the example ICE 100 is able to distinguish and process electromagnetic radiation related to the characteristic or analyte of interest are described in U.S. Pat. Nos. 6,198,531, 6,529,276 and 7,920,258.

Figure 2:
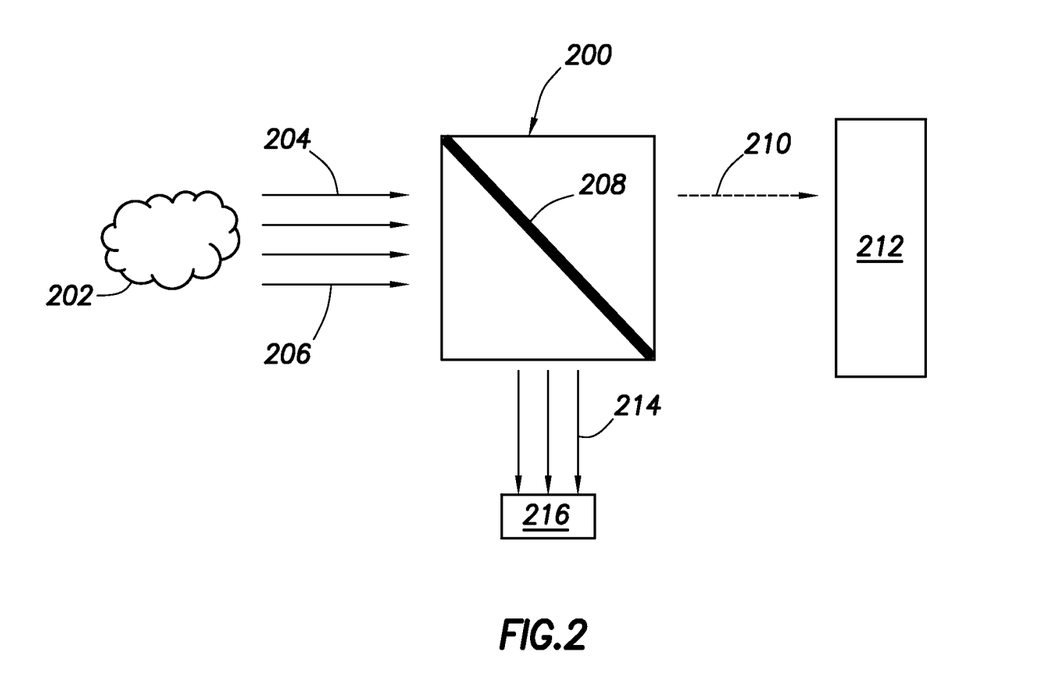
FIG. 2 is a representative schematic view of an example of an optical computing device that may be used in systems and methods incorporating the principles of this disclosure.

Referring additionally now to FIG. 2, illustrated is a block diagram that non-mechanistically illustrates how an optical computing device 200 is able to distinguish electromagnetic radiation related to a characteristic of a substance from other electromagnetic radiation. As shown in FIG. 2, after being illuminated with incident electromagnetic radiation (or producing or transmitting electromagnetic radiation), a substance 202 produces an output of electromagnetic radiation (e.g., sample-interacted light), some of which is electromagnetic radiation 204 corresponding to a characteristic of interest and some of which is background electromagnetic radiation 206 corresponding to other components or characteristics of the substance 202.

Although not specifically shown, one or more spectral elements may be employed in the device 200 in order to restrict evaluated optical wavelengths and/or bandwidths, and thereby eliminate unwanted electromagnetic radiation existing in wavelength regions that have no apparent importance. Such spectral elements can be located anywhere, but are typically employed directly after a light source that provides the initial electromagnetic radiation (unless, for example, the electromagnetic radiation 204 emanates from the substance 202 itself). Various configurations and applications of spectral elements in optical computing devices may be found in commonly owned U.S. Pat. Nos. 6,198,531, 6,529,276, 7,123,844, 7,834,999, 7,911,605, 7,920,258 and 8,049,881, 8,208,147, 8,358,418 and US publication no. 2013/0286399, mentioned above.

The electromagnetic radiations 204, 206 impinge upon the optical computing device 200, which contains an example ICE 208 therein. In the illustrated embodiment, the ICE 208 may be configured to produce optically interacted light or other electromagnetic radiation, for example, transmitted optically interacted light 210 and reflected optically interacted light 214. In operation, the ICE 208 may be configured to distinguish the electromagnetic radiation 204 from the background electromagnetic radiation 206.

The transmitted optically interacted light 210, which may be related to the characteristic or analyte of interest of the substance 202, may be conveyed to a detector 212 (such as, a photodiode, photo detector or opto-electric converter, etc.) for analysis and quantification. In some embodiments, the detector 212 is configured to produce an output signal in the form of a voltage that corresponds to the particular characteristic of the substance 202.

In at least one embodiment, the signal produced by the detector 212 and the concentration, volume or extent of the characteristic of the substance 202 may be directly proportional. In other embodiments, the relationship may be a polynomial function, an exponential function, and/or a logarithmic function.

The reflected optically interacted light 214, which may be related to the characteristic and other components of the substance 202, can be directed away from detector 212. In alternative configurations, the ICE 208 may be configured such that the reflected optically interacted light 214 can be related to the analyte of interest, and the transmitted optically interacted light 210 can be related to other components of the substance 202.

In some examples, a second detector 216 can be arranged to detect the reflected optically interacted light 214. In other examples, the second detector 216 may be arranged to detect the electromagnetic radiation 204, 206 from the substance 202, or electromagnetic radiation directed toward or before the substance 202.

Without limitation, the second detector 216 may be used to detect radiating deviations stemming from an electromagnetic radiation source (not shown), which provides the electromagnetic radiation to the device 200. For example, radiating deviations can include such things as, but not limited to, intensity fluctuations in the electromagnetic radiation, interferent fluctuations (e.g., dust or other interferents passing in front of the electromagnetic radiation source), coatings on windows included with the optical computing device 200, combinations thereof, or the like.

In some embodiments, a beam splitter (not shown) can be employed to split the electromagnetic radiation 204, 206, and the transmitted or reflected electromagnetic radiation can then be directed to one or more ICE 208. That is, in such embodiments, the ICE 208 does not function as a type of beam splitter, as depicted in FIG. 2, and the transmitted or reflected electromagnetic radiation simply passes through the ICE 208, being computationally processed therein, before impinging on the detector 212.

The characteristic(s) of the substance 202 being analyzed using the optical computing device 200 can be further processed computationally to provide additional characterization information about the fluid 202. In some embodiments, the identification and concentration of each analyte in the substance 202 can be used to predict certain physical characteristics of the substance 202. For example, bulk characteristics of a substance 202 can be estimated by using a combination of properties conferred to the substance 202 by each analyte.

In some embodiments, the concentration of each analyte or the magnitude of each characteristic determined using the optical computing device 200 can be fed into an algorithm operating under computer control. The algorithm may be configured to make predictions on how the characteristics of the substance 202 change if certain mitigation techniques are used (for example, if a certain cleaning preparation is used in a certain concentration, etc.).

In some embodiments, the algorithm can produce an output that is readable by an operator, who can manually take appropriate action, if needed, based upon the output. In some embodiments, the algorithm can take proactive process control by automatically selecting and applying an appropriate mitigation technique.

The algorithm can be part of an artificial neural network configured to use the concentration of each detected analyte in order to evaluate the overall characteristic(s) of the substance 202 and predict how to mitigate the substance 202 in a desired way. Illustrative but non-limiting artificial neural networks are described in commonly owned US publication no. 2009/0182693.

It will be appreciated that an artificial neural network can be trained using samples of substances having known concentrations, compositions, and/or properties, and thereby generating a virtual library. As the virtual library available to the artificial neural network becomes larger, the neural network can become more capable of accurately predicting the characteristics of a substance having any number of analytes present therein. Furthermore, with sufficient training, the artificial neural network can more accurately predict the characteristics of the substance, even in the presence of unknown analytes.

The various embodiments herein directed to computer control and artificial neural networks, including various blocks, modules, elements, components, methods, and algorithms, can be implemented using computer hardware, software, combinations thereof, and the like. To illustrate this interchangeability of hardware and software, various illustrative blocks, modules, elements, components, methods and algorithms have been described generally in terms of their functionality.

Whether such functionality is implemented as hardware or software will depend upon the particular application and any imposed design constraints. For at least this reason, it will be appreciated that one of ordinary skill in the art can implement the described functionality in a variety of ways for a particular application. Further, various components and blocks can be arranged in a different order or partitioned differently, for example, without departing from the scope of the embodiments expressly described herein.

Computer hardware used to implement the various illustrative blocks, modules, elements, components, methods, and algorithms described herein can include a processor configured to execute one or more sequences of instructions, programming stances, or code stored on a non-transitory, computer-readable medium. The processor can be, for example, a general purpose microprocessor, a microcontroller, a digital signal processor, an application specific integrated circuit, a field programmable gate array, a programmable logic device, a controller, a state machine, a gated logic, discrete hardware components, an artificial neural network, or any like suitable entity that can perform calculations or other manipulations of data. In some embodiments, computer hardware can further include elements, such as, a memory (e.g., random access memory (RAM), flash memory, read only memory (ROM), programmable read only memory (PROM), erasable programmable read only memory (EPROM)), registers, hard disks, removable disks, CD-ROM's, DVD's, or any other like suitable storage device or medium.

Executable sequences described herein can be implemented with one or more sequences of code contained in a memory. In some embodiments, such code can be read into the memory from another machine-readable medium. Execution of the sequences of instructions contained in the memory can cause a processor to perform the process steps described herein. One or more processors in a multi-processing arrangement can also be employed to execute instruction sequences in the memory. In addition, hard-wired circuitry can be used in place of or in combination with software instructions to implement various embodiments described herein. Thus, the scope of this disclosure is not limited to any specific combination of hardware and/or software.

As used herein, the term "machine-readable medium" refers to any medium that directly or indirectly provides instructions to a processor for execution. A machine-readable medium can take on many forms including, for example, non-volatile media, volatile media, and transmission media. Non-volatile media can include, for example, optical and magnetic disks. Volatile media can include, for example, dynamic memory. Transmission media can include, for example, coaxial cables, wire, fiber optics, and wires that form a bus. Common forms of machine-readable media can include, for example, floppy disks, flexible disks, hard disks, magnetic tapes, other like magnetic media, CD-ROM's, DVD's, other like optical media, punch cards, paper tapes and like physical media with patterned holes, RAM, ROM, PROM, EPROM and flash EPROM.

In some embodiments, data collected using the optical computing devices can be archived along with data associated with operational parameters being logged at a job site. Evaluation of job performance can then be assessed and improved for future operations, or such information can be used to design subsequent operations.

In addition, the data and information can be communicated (wired or wirelessly) to a remote location by a communication system (e.g., satellite communication or wide area network communication) for further analysis. The communication system can also allow remote monitoring and operation of a process to take place.

Automated control with a long-range communication system can further facilitate the performance of remote job operations. In particular, an artificial neural network can be used in some embodiments to facilitate the performance of remote job operations. That is, remote job operations can be conducted automatically in some embodiments. In other embodiments, however, remote job operations can occur under direct operator control, where the operator is not at the job site.

Figure 3:
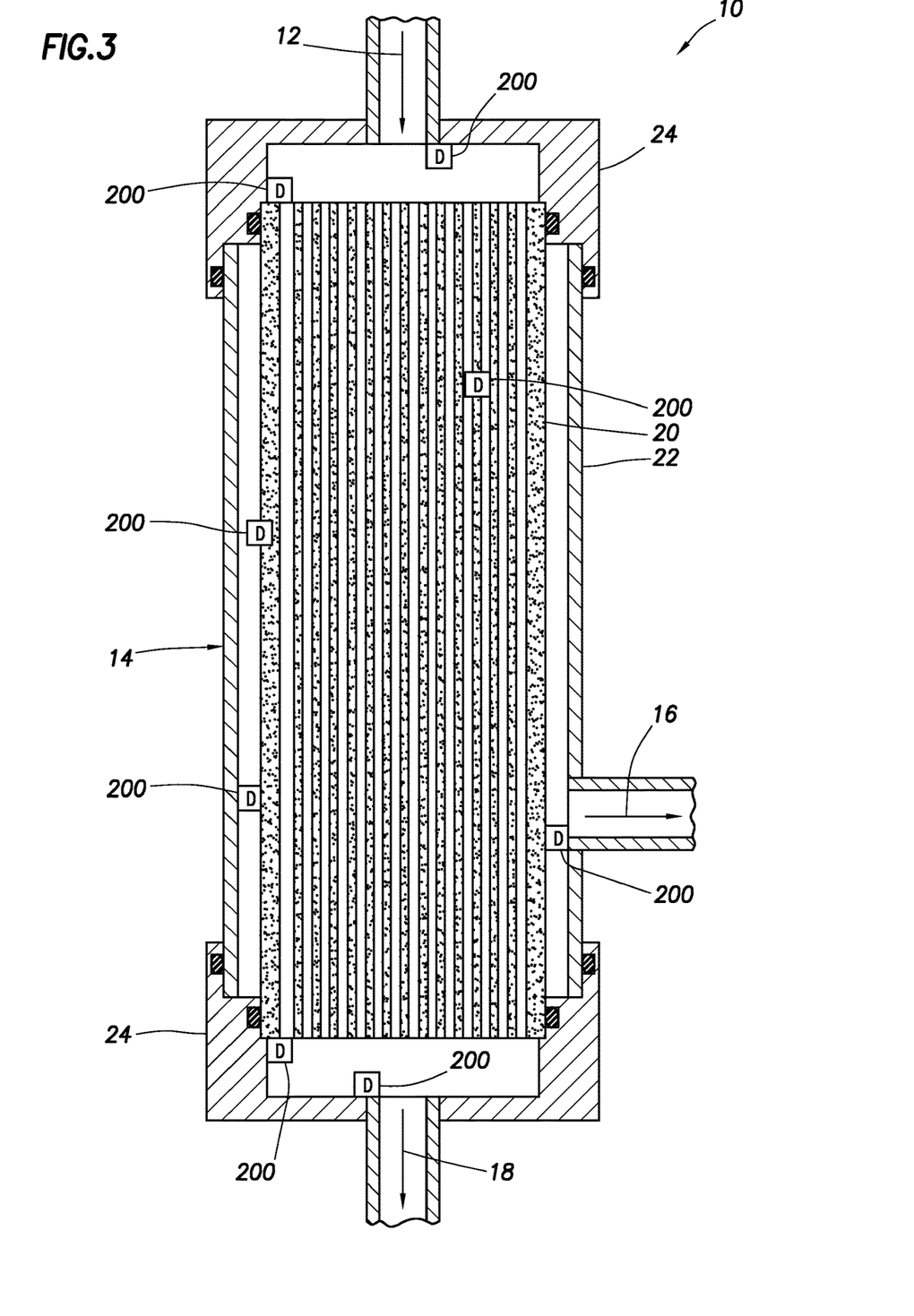
FIG. 3 is a representative cross-sectional view of a system and method that can incorporate the principles of this disclosure.

Representatively illustrated in FIG. 3 is an example of a filter system 10 and associated method which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 3 filter system 10, a feed 12 flow is received into a filter assembly 14. The filter assembly 14 is configured to separate a permeate 16 from a concentrate 18. For this purpose, the assembly 14 includes a filter 20 arranged in an outer housing 22.

In some examples, the feed 12 can comprise formation water containing contaminates (such as broken gel, biocides, bacteria and/or particulates), flu gas (for example, containing $H_2S$, $CO_2$ and $CH_4$ mixtures) or produced water containing oil and water emulsions, etc. The concentrate 18 can comprise the broken gel, biocides, bacteria, particulates, $H_2S$, $CO_2$ and/or oil, etc. The permeate 16 can comprise clean water and/or $CH_4$. However, it should be clearly understood that these are merely non-limiting examples of the feed 12, permeate 16 and concentrate 18, and that the scope of this disclosure is not limited to any particular filtering operation.

The filter 20 in the FIG. 3 example is a ceramic membrane filter. However, other types of permeable or semi-permeable barriers may be used for the filter 20, and it is not necessary for the filter to be a "membrane" filter at all. In some examples, the filter 20 could be a reverse osmosis filter, a nano-filtration filter, an ultra-filtration filter, a hollow fiber micro-filtration filter, a membrane cartridge filter, a granular media filter, etc. Thus, the scope of this disclosure is not limited to use of any particular type of filter 20 in the system 10.

Also included in the system 10 are multiple optical computing devices 200 in the assembly 14. The devices 200 are indicated by the letter D in FIG. 3. Although multiple devices 200 are depicted in FIG. 3, only one device may be used in some examples.

Note that some of the devices 200 are external to the filter 20, some of the devices are internal to the filter, at least one of the devices is imbedded in a surface of the filter, one of the devices is adjacent an input of the feed 12, one of the devices is adjacent an output of the permeate 16, one of the devices is adjacent an output of the concentrate 18, and multiple devices are located in each of two heads 24 that close off ends of the housing 22. Positions of the devices 200 depicted in FIG. 3 are to illustrate that there exists a wide variety of possibilities for positioning one or more devices to detect a presence, type, extent or other characteristic of a substance on or in the filter 20. However, the scope of this disclosure is not limited to any particular position or combination of positions of device(s) 200 relative to the filter 20.

Each of the devices 200 is capable of evaluating at least one characteristic of a substance (such as the substance 202 of FIG. 2). The substance may be a substance which fouls the filter 20, for example, by restricting or blocking flow through the filter. In some examples, the substance 202 could be a structural portion of the filter 20 itself (e.g., so that an integrity of the filter can be evaluated using the system 10).

Because the devices 200 are operable while the filter 20 is used in situ, characteristics of the substance can be evaluated in real time while the filter is being used. Thus, there is not need to take the filter assembly 14 off-line to remove the filter 20, remove the substance or a portion of the filter with the substance, transport the substance to a laboratory for analysis, etc. Instead, the filter 20 can remain operatively installed in the assembly 14 while any mitigating treatments are performed.

A particular mitigating treatment can be selected, based on the characteristics of the substance determined using the devices 200. Thus, time and expense are not wasted on use of ineffective mitigating treatments.

The mitigating treatments can evaluated by monitoring the characteristics of the substance, for example, before, after and/or during the mitigating treatments. Effectiveness of a mitigating treatment can be optimized during the treatment, because effects of the treatment on the substance can be known in real time (e.g., while the treatment is being performed).

Figure 4:
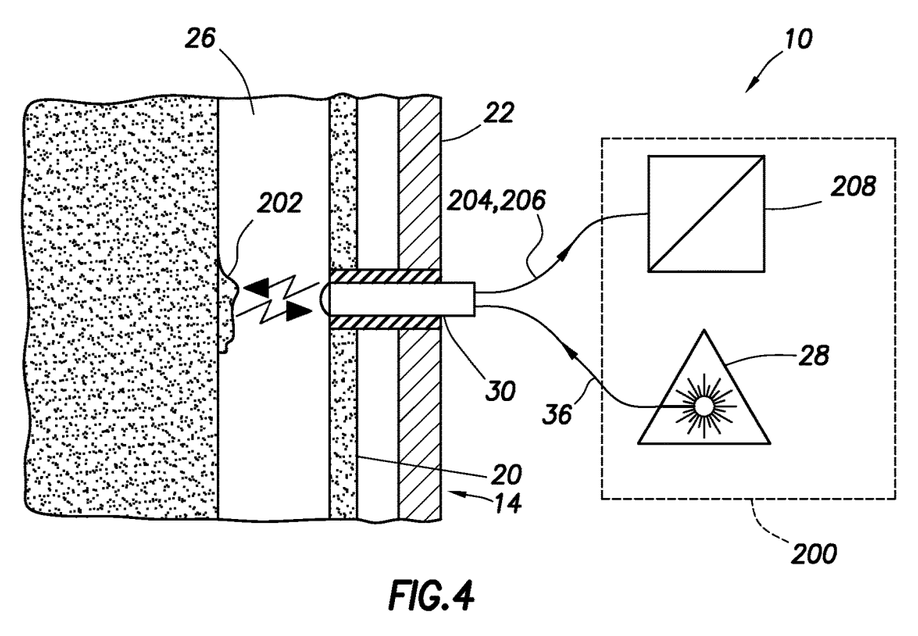
FIGS. 4 & 5 are representative cross-sectional views of examples of the system and method, in which elements of the optical computing device are external to a filter assembly.

Referring additionally now to FIG. 4, an enlarged scale cross-sectional view of another example of the system 10 is representatively illustrated. In this example, most components of an optical computing device 200 are external to the filter assembly 14.

As depicted in FIG. 4, the ICE 208 and an electromagnetic radiation source 28 (such as, a laser, a light emitting diode, optical lamp, fluorescent excitation source, etc.) are located outside of the filter housing 14. Light or other electromagnetic radiation 36 is transmitted via optical fibers or other electromagnetic waveguides to a sealed bulkhead 30 extending through the housing 22, so that the electromagnetic radiation can impinge on the substance 202.

In this example, the substance 202 is located in a pore or passage 26 of the filter 20. In other examples, the substance 202 could be located external to the filter 20, such as, in the heads 24, in a space between the filter and the housing 22, etc. Thus, the scope of this disclosure is not limited to any particular location of the substance 202.

Electromagnetic radiation 204 that is reflected from, transmitted through, fluoresces from, or otherwise emanates from the substance 202 is directed to the ICE 208 for evaluation. Although a detector 212 (see FIG. 2) is not depicted in FIG. 4, the detector can be included in the device 200 for producing an input that correlates to the relevant characteristic of the substance 202.

Figure 5:
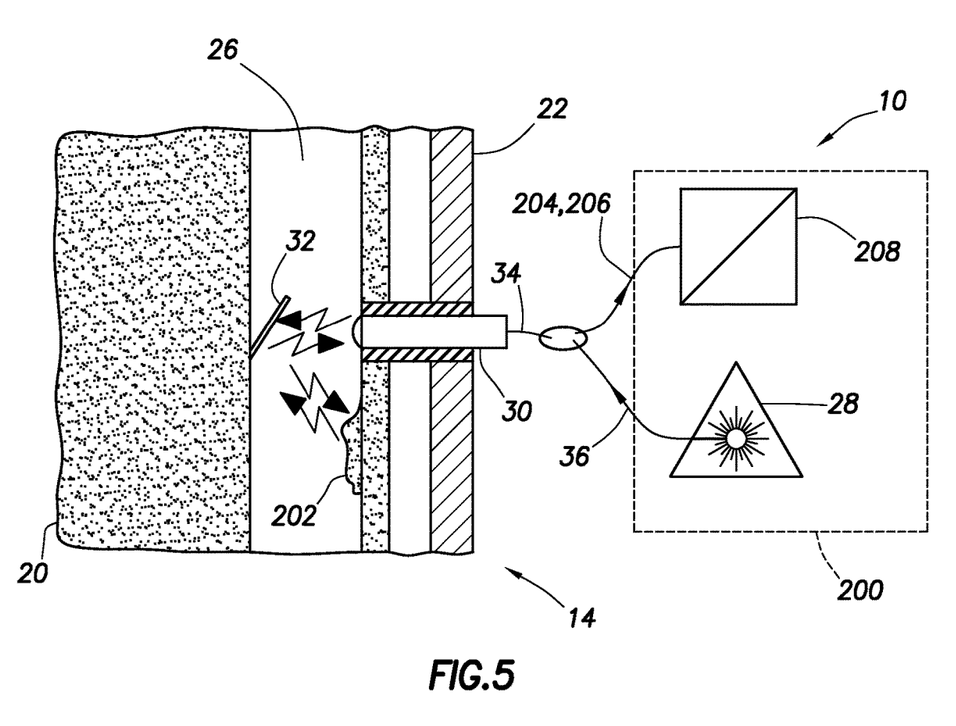

Referring additionally now to FIG. 5, a cross-sectional view of another example of the system 10 is representatively illustrated. In this example, a reflector 32 is used to reflect light or other electromagnetic radiation 36 from the bulkhead 30 to the substance 202 in the filter 20, and to direct electromagnetic radiation from the substance in an opposite direction. In addition, a single waveguide 34 is used to both transmit the electromagnetic radiation from the source 28 to the bulkhead 30, and from the bulkhead to the ICE 208.

Figure 6:
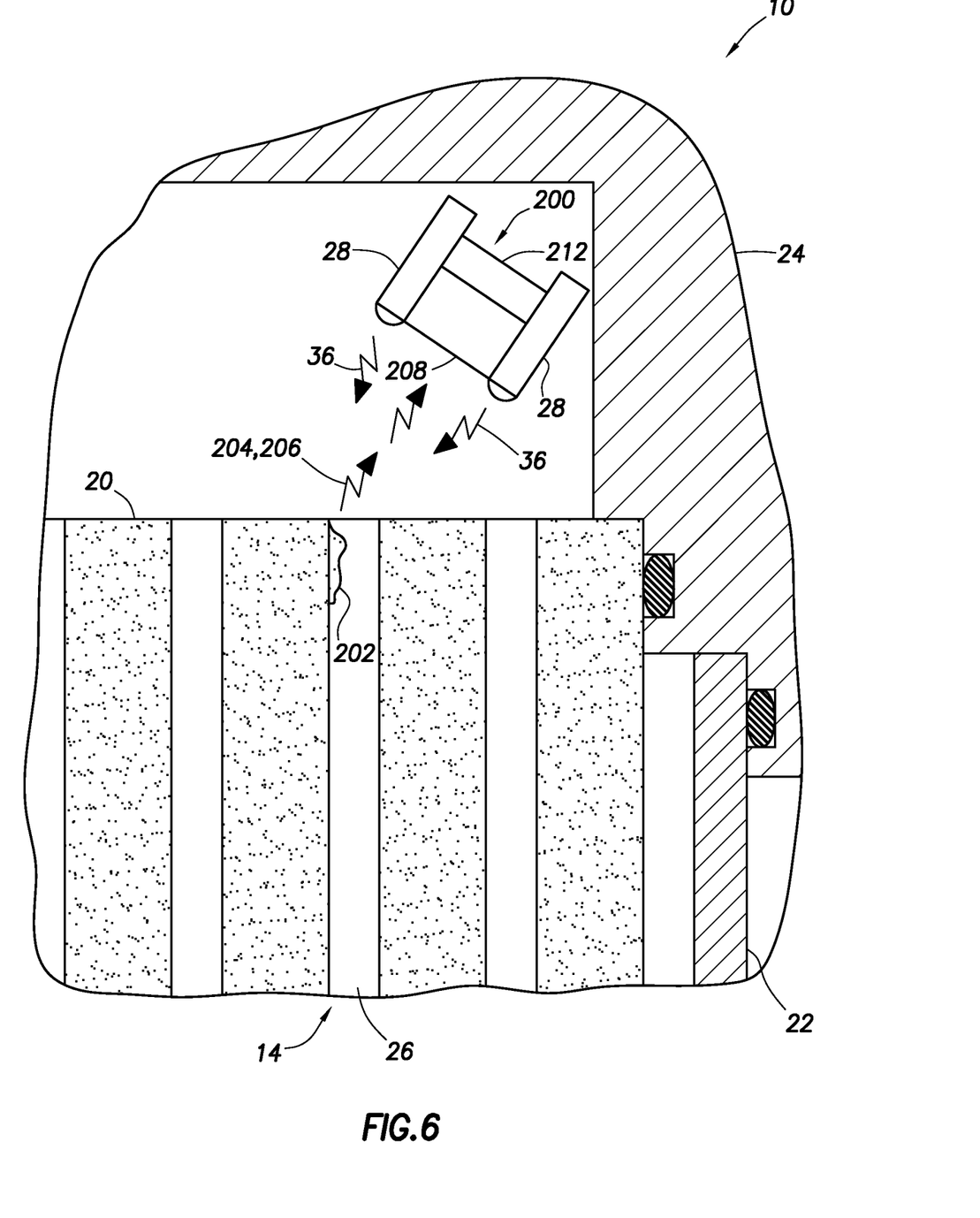
FIG. 6 is a representative partially cross-sectional view of an example of the system and method, in which elements of the optical computing device are positioned within the filter assembly.

Referring additionally now to FIG. 6, a cross-sectional view of another example of the system 10 is representatively illustrated. In this example, the device 200 is located in one of the heads 24 of the filter assembly 14. The device 200 includes multiple electromagnetic radiation sources 28 that direct electromagnetic radiation 36 to impinge on the substance 202 in a pore or passage 26 of the filter 20. Electromagnetic radiation 204, 206 is received by the ICE 208, and an output correlated to the characteristic of the substance 202 is produced by the detector 212.

Figure 7:
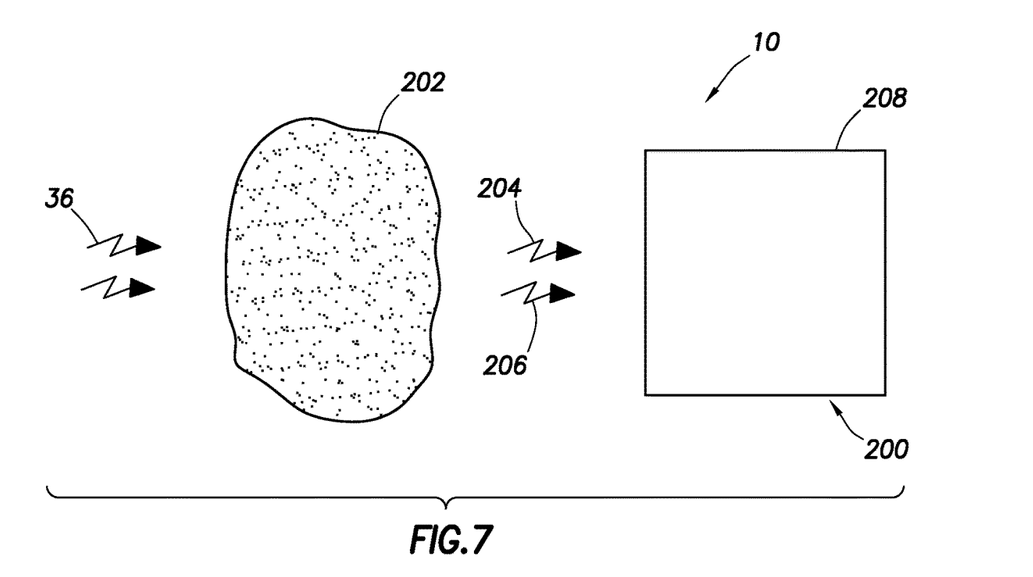
FIGS. 7 & 8 are representative schematic views of examples of the system and method, in which electromagnetic radiation is transmitted through, or causes emission of electromagnetic radiation from, a substance.

Referring additionally now to FIG. 7, a schematic view of another example of the system 10 is representatively illustrated. In this example, the electromagnetic radiation 36 interacts with the substance 202 by being transmitted through the substance, or by causing radiation to be produced by the substance (for example, by fluorescence or blackbody radiation).

In some examples, the radiation of interest 204 and/or the background radiation 206 could be produced without impinging radiation 36 on the substance 202. For example, the substance 202 could be luminescent or the radiation 204 could be intrinsic blackbody radiation.

Figure 8:
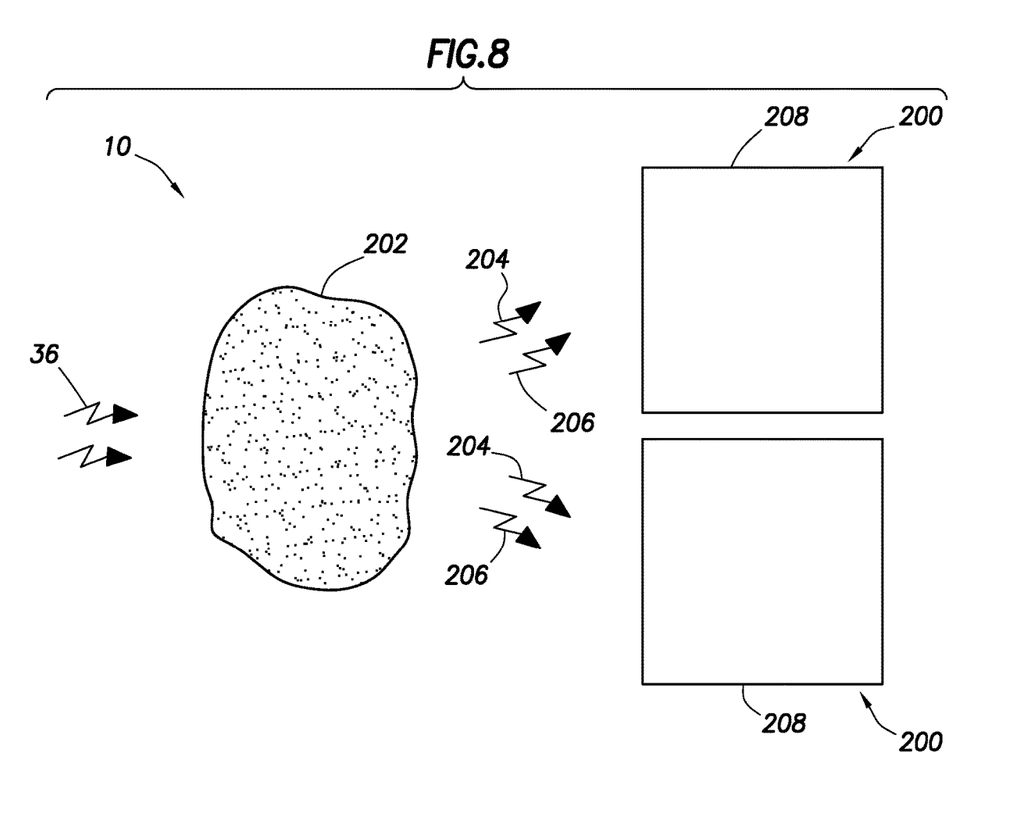

FIG. 8 depicts a similar example of the system 10, in which the radiation of interest 204 and the background radiation 206 are transmitted to multiple ICE's 208. The radiation 204, 206 (or only the radiation 204, e.g., using one or more filters to eliminate the radiation 206) could be transmitted to the ICE's simultaneously, or one at a time.

For example, beam splitters (not shown) could be used to direct the radiation 204 to the ICE's 208 simultaneously. As another example, a movable reflector (not shown) or a turntable (not shown) could be used to direct the radiation 204 to the ICE's 208 one at a time, or to position the ICE's one at a time in a path of the radiation.

The multiple ICE's 208 may be used for analysis of multiple corresponding different analytes. A single detector 212 (see FIG. 2) could be used with the multiple ICE's 208, or each ICE could be provided with a detector.

Figure 9:
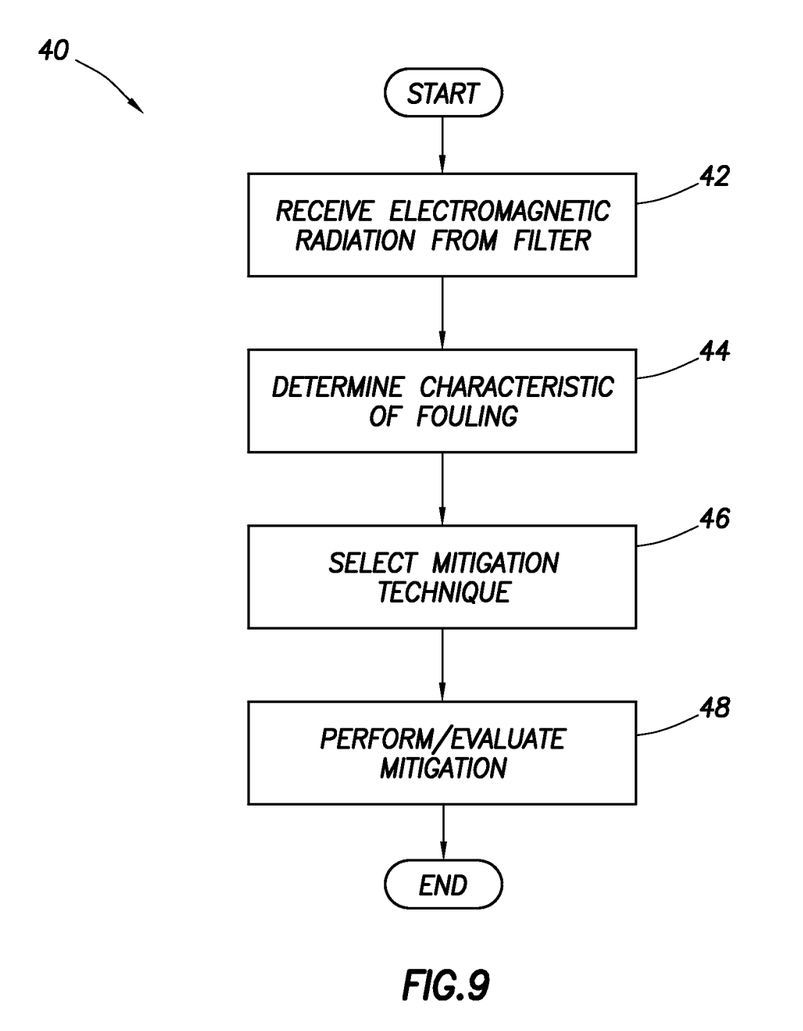
FIG. 9 is a representative flowchart for an example of a method of evaluating one or more parameters of a filter.

Referring additionally now to FIG. 9, a method 40 of evaluating one or more parameters of a filter is representatively illustrated in flowchart form. The method 40 may be practiced with the system 10 examples of FIGS. 3-8, or it may be practiced with other systems. The method 40 may be practiced with the filter 20 and optical computing device examples 200 of FIGS. 1-8, or it may be practiced with other elements and/or components.

In step 42 of the method 40, electromagnetic radiation 204, 206 are received from the filter 20. The electromagnetic radiation of interest 204 may interact with the substance 202 by reflection, transmission, emission, fluorescence, luminescence, or by any other form of production or interaction that causes the radiation to include a "fingerprint" of a characteristic of the substance.

In this example, the radiation 204, 206 is received from the filter 20 in real time, while the filter is in situ. The filter 20 may even be in use while the radiation 204, 206 is received from the filter.

In step 44, the electromagnetic radiation 204 is evaluated by an ICE 208 to determine the characteristic of the substance 202. In this example, presence of the substance 202 results in fouling of the filter 20 and so, by determining the characteristic of the substance (its presence, type, chemical makeup, location, extent, volume, etc.), the nature of the fouling is also determined. In other examples, the substance 202 may not result in fouling of the filter 20, but may, for example, be a byproduct of the filtering process.

In step 46, a mitigation technique is selected. This selection is informed by the determination of the characteristic of the substance 202 in step 44.

Once the characteristic of the substance 202 is known (from step 44), an appropriate mitigation technique can be immediately selected. Thus, an appropriate mitigation technique can be selected for a known characteristic of the substance 202 in real time, without having to take the filter 20 off-line.

In step 48, the selected mitigation technique is performed, in order to totally or substantially eliminate the substance 202 from the filter assembly 14. For example, an appropriate chemical treatment could be injected into the feed 12 (see FIG. 3), so that the chemical treatment would react with the substance 202 on and/or in the filter 20. In other examples, the mitigation technique could be performed while the feed 12 is not flowed into the filter assembly 14.

Simultaneous with, or at least after (and possibly before), performance of the mitigation technique, an evaluation of the mitigation technique can be performed. The evaluation can be used to determine whether the mitigation technique is effective in removal of the substance 202, whether changes to the mitigation technique should be made to improve or optimize removal of the substance, or whether another mitigation technique would be more effective. This evaluation can be performed in real time, while the mitigation technique is being performed, and possibly while the filter 20 is still online.

The steps 42-48 can be performed continuously, repeatedly or periodically as desired to maintain effective filtering capabilities of the filter 20. If the method 40 eventually indicates that the filter 20 can no longer effectively perform its function (e.g., it is no longer cost effective to perform mitigation treatments, no mitigation treatment is adequately effective, or the filter's integrity has been compromised), it may be determined that replacement of the filter is appropriate.

It may now be fully appreciated that the above disclosure provides significant advancements to the art of evaluating filter parameters. In examples described above, characteristics of a substance 202 in or on a filter 20 can be determined while the filter is in situ, thereby enabling an appropriate cost effective mitigation treatment to be performed when needed, and in a timely manner.

A system 10 is provided to the art by the above disclosure. In one example, the system 10 can include a filter assembly 14 comprising a filter 20 and a substance 202 in the filter assembly 14, and at least one optical computing device 200 having an integrated computational element 208 which receives electromagnetic radiation 204 from the substance 202.

The system 10 can also include at least one detector 212 which receives electromagnetic radiation 210 from the integrated computational element 208. The electromagnetic radiation 210 from the integrated computational element 208 is interacted with the integrated computational element 208. The detector 212 can produce an output that is correlated to a characteristic of the substance 202. The detector 212 may comprise a human eye, a camera, a photo-detector, a photodiode and/or an opto-electric converter.

The electromagnetic radiation 204 from the substance 202 has previously been interacted with the substance 202. The electromagnetic radiation 204 from the substance 202 can be at least one of the group consisting of reflected, transmitted, emitted, luminesced, fluoresced, scattered and re-radiated from the substance 202.

The substance 202 may comprise at least one of bacteria, carbonate, sulfonate, iron scaling, asphaltene, wax, long chain hydrocarbon, an isotope, an ion, large or small organic or inorganic molecules, organic and inorganic polymer, protein, emulsion, biological matter, particulate, gas (such as hydrogen sulfide and carbon dioxide), organic or inorganic nanoparticles, microparticles or macroparticles, and gas calthrate. However, the scope of this disclosure is not limited to any particular type, size or composition of the substance 202.

The integrated computational element 208 may be positioned internal or external to the filter assembly 14. The integrated computational element 208 may be embedded in or internal to the filter 20.

The integrated computational element 208 can receive the electromagnetic radiation 204 from the substance 202 with the filter 20 being in situ, or at least while the filter 20 is received in the filter assembly 14. The electromagnetic radiation 204 from the substance 202 may comprise light. As used herein, the term "light" encompasses electromagnetic radiation in visible, ultra-violet, near infrared and infrared regions of electromagnetic spectra.

The integrated computational element 208 may receive the electromagnetic radiation 204 from the substance 202 while the substance 202 is on or in the filter 20.

A method 40 is also provided to the art by the above disclosure. In one example, the method 40 can comprise receiving electromagnetic radiation 204 from a substance 202 in a filter assembly 14. The electromagnetic radiation 204 from the substance 202 is received by at least one optical computing device 200 having an integrated computational element 208. The receiving step is performed while a filter 20 is positioned in the filter assembly 14.

At least one detector 212 may receive electromagnetic radiation 210 from the integrated computational element 208. The electromagnetic radiation 210 from the integrated computational element 208 has been interacted with the integrated computational element 208.

The detector 212 produces an output that is correlated to a characteristic of the substance 202. The method can include selecting a technique which mitigates a presence of the substance 202 in the filter assembly 14, based on the detector 212 output.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A system for identifying a characteristic of a substance, comprising:
   a filter assembly comprising a filter configured to filter the substance;
   at least one optical computing device comprising an integrated computational element positioned external to the filter assembly and which receives electromagnetic radiation reflected from the substance or transmitted through the substance in the filter assembly and transmits optically interacted electromagnetic radiation; and
   at least one detector positioned and operable to receive the optically interacted electromagnetic radiation from the integrated computational element and produce an output correlated to a characteristic of the substance.

2. The system of claim 1, wherein the electromagnetic radiation interacts with the integrated computational element.

3. The system of claim 1, wherein the detector is selected from the group consisting of a human eye, a camera, a photo-detector, a photodiode and an opto-electric converter.

4. The system of claim 1, wherein the electromagnetic radiation interacts with the substance.

5. The system of claim 1, wherein the electromagnetic radiation from the substance is at least one of the group consisting of reflected, transmitted, emitted, luminesced, fluoresced, scattered and re-radiated from the substance.

6. The system of claim 1, wherein the substance comprises at least one of the group consisting of bacteria, carbonate, sulfonate, iron scaling, asphaltene, wax, long chain hydrocarbon, an isotope, an ion, organic or inorganic molecules, organic or inorganic polymer, protein, emulsion, biological matter, particulate, gas, organic or inorganic nanoparticles, organic or inorganic microparticles, organic or inorganic macroparticles and gas calthrate.

7. The system of claim 1, wherein the integrated computational element receives the electromagnetic radiation from the substance with the filter being in situ.

8. The system of claim 1, wherein the electromagnetic radiation from the substance comprises light in a visible, ultraviolet, near infrared and/or infrared spectrum.

9. The system of claim 1, wherein the integrated computational element receives the electromagnetic radiation from the substance while the substance is on the filter.

10. The system of claim 1, wherein the integrated computational element receives the electromagnetic radiation from the substance while the substance is in the filter.

11. A method, comprising:
    receiving electromagnetic radiation by at least one optical computing device comprising an integrated computational element from a substance filtered by a filter assembly, the electromagnetic radiation being reflected from the substance or transmitted through the substance in the filter assembly;
    transmitting optically interacted electromagnetic radiation from the integrated computational element;
    receiving the transmitted optically interacted electromagnetic radiation by at least one detector;
    producing an output from the at least one detector correlated to a characteristic of the substance; and
    selecting a technique which mitigates a presence of the substance in the filter assembly, based on the detector output.

12. The method of claim 11, wherein the electromagnetic radiation interacts with the integrated computational element.

13. The method of claim 11, wherein the detector is selected from the group consisting of a human eye, a camera, a photo-detector, a photodiode and an opto-electric converter.

14. The method of claim 11, wherein the electromagnetic radiation interacts with the substance.

15. The method of claim 11, wherein the electromagnetic radiation from the substance is at least one of the group consisting of reflected, transmitted, emitted, luminesced, fluoresced, scattered and re-radiated from the substance.

16. The method of claim 11, wherein the substance comprises at least one of the group consisting of bacteria, carbonate, sulfonate, iron scaling, asphaltene, wax, long chain hydrocarbon, an isotope, an ion, organic or inorganic molecules, organic or inorganic polymer, protein, emulsion, biological matter, particulate, gas, organic or inorganic nanoparticles, organic or inorganic microparticles, organic or inorganic macroparticles and gas calthrate.

17. The method of claim 11, further comprising positioning the integrated computational element internal to the filter assembly.

18. The method of claim 11, further comprising positioning the integrated computational element external to the filter assembly.

19. The method of claim 11, further comprising embedding the integrated computational element in the filter.

20. The method of claim 11, wherein the integrated computational element is internal to the filter.

21. The method of claim 11, wherein the electromagnetic radiation from the substance comprises light in a visible, ultraviolet, near infrared and/or infrared spectrum.

22. The method of claim 11, wherein the integrated computational element receives the electromagnetic radiation from the substance while the substance is on the filter.

23. The method of claim 11, wherein the integrated computational element receives the electromagnetic radiation from the substance while the substance is in the filter.

* * * * *